United States Patent
Joerpeland et al.

(10) Patent No.: US 10,605,049 B2
(45) Date of Patent: Mar. 31, 2020

(54) CHEMICAL INJECTION VALVE WITH ENHANCED SEALING CAPABILITY

(71) Applicant: WEATHERFORD TECHNOLOGY HOLDINGS, LLC, Houston, TX (US)

(72) Inventors: Sven C. Joerpeland, Stavanger (NO); Kaj Stokkeland, Sirevag (NO); Brian M. Sternaman, Lafayette, LA (US); Zlatko X. Salihbegovic, New Iberia, LA (US)

(73) Assignee: Weatherford Technology Holdings, LLC, Houston, TX (US)

( * ) Notice: Subject to any disclaimer, the term of this patent is extended or adjusted under 35 U.S.C. 154(b) by 168 days.

(21) Appl. No.: 15/799,176

(22) Filed: Oct. 31, 2017

(65) Prior Publication Data

US 2018/0142533 A1    May 24, 2018

Related U.S. Application Data

(60) Provisional application No. 62/424,906, filed on Nov. 21, 2016.

(51) Int. Cl.
*E21B 34/10* (2006.01)
*E21B 34/06* (2006.01)
(Continued)

(52) U.S. Cl.
CPC ............ *E21B 34/10* (2013.01); *E21B 34/063* (2013.01); *E21B 37/06* (2013.01); *E21B 41/02* (2013.01);
(Continued)

(58) Field of Classification Search
CPC ........ E21B 34/10; E21B 34/063; E21B 37/06; E21B 41/02
See application file for complete search history.

(56) References Cited

U.S. PATENT DOCUMENTS

| 3,363,581 A | 1/1968 | Kelley et al. |
| 4,480,687 A | 11/1984 | Terral |

(Continued)

FOREIGN PATENT DOCUMENTS

| EP | 2990592 A1 | 3/2016 |
| GB | 2344364 A | 6/2000 |

OTHER PUBLICATIONS

International Search Report with Written Opinion dated Feb. 21, 2018 for PCT Patent Application No. PCT/US2017/061086, 15 pages.

(Continued)

*Primary Examiner* — Nicole Coy
(74) *Attorney, Agent, or Firm* — Smith IP Services, P.C.

(57) ABSTRACT

A chemical injection valve can include a valve stem reciprocably disposed relative to a primary seal, and a variable flow restrictor upstream of the primary seal relative to a direction of flow through the chemical injection valve. The variable flow restrictor restricts the flow when the valve stem is disengaged from the primary seal. A chemical injection system can include a chemical treatment pumped through a chemical injection valve and into an interior of a tubular string in a well, the chemical injection valve including a valve stem, a primary seal sealingly engaged with the valve stem in a closed position and disengaged from the valve stem in an open position, and a flow restrictor that restricts the flow of the chemical treatment downstream from the primary seal in the open position.

23 Claims, 6 Drawing Sheets

(51) Int. Cl.
*E21B 37/06* (2006.01)
*E21B 41/02* (2006.01)
*F16K 17/16* (2006.01)
*F16K 17/04* (2006.01)
*F16K 17/40* (2006.01)
*F16K 47/04* (2006.01)

(52) U.S. Cl.
CPC ........ *F16K 17/0466* (2013.01); *F16K 17/162* (2013.01); *F16K 17/40* (2013.01); *F16K 17/403* (2013.01); *F16K 47/04* (2013.01)

(56) References Cited

U.S. PATENT DOCUMENTS

| | | |
|---|---|---|
| 4,562,854 A | 1/1986 | Pringle et al. |
| 5,004,007 A | 4/1991 | Johnson et al. |
| 7,647,975 B2 | 1/2010 | Messick et al. |
| 2005/0126638 A1 | 6/2005 | Gilbert |
| 2009/0217988 A1 | 9/2009 | Maxwell |
| 2010/0224807 A1 | 9/2010 | Brizes |
| 2012/0103608 A1 | 5/2012 | Van Petegem et al. |
| 2012/0204977 A1 | 8/2012 | Lembcke |
| 2013/0032226 A1 | 2/2013 | Salihbegovic |
| 2016/0003005 A1* | 1/2016 | Pickle ............... E21B 34/10 166/374 |
| 2016/0053579 A1 | 2/2016 | Salihbegovic |
| 2017/0254177 A1 | 9/2017 | Woodford |

OTHER PUBLICATIONS

International Search Report with Written Opinion dated Feb. 19, 2019 for PCT Patent Application No. PCT/US2018/057002, 13 pages.

Specification and drawings for U.S. Appl. No. 15/799,039, filed Oct. 31, 2017, 28 pages.

Weatherford; "Tubing-Retrievable Chemical-Injection Valve", company article No. 3004.00, dated 2005, 2 pages.

Weatherford; "Chemical-Injection Side-Pocket Mandrels—Round, Solid-Body", company article No. 3011.01, dated 2005-2007, 4 pages.

Weatherford; "Tubing-Retrievable Chemical-Injection Mandrels", company article No. 3005.00, dated 2006, 3 pages.

Office Action dated Aug. 2, 2019 for U.S. Appl. No. 15/799,039, 29 pages.

* cited by examiner

CHEMICAL INJECTION VALVE WITH ENHANCED SEALING CAPABILITY

CROSS-REFERENCE TO RELATED APPLICATION

This application claims the benefit of the filing date of U.S. provisional application No. 62/424,906 filed on 21 Nov. 2016. The entire disclosure of this prior application is incorporated herein by this reference.

BACKGROUND

This disclosure relates generally to equipment utilized and operations performed in conjunction with a subterranean well and, in examples described below, more particularly provides for stem bypass flow and seal longevity in a downhole chemical injection valve.

A chemical injection valve can be used to control injection of a chemical treatment into fluids produced from a well. The chemical treatment is typically in the form of a liquid composition selected for certain benefits (such as, corrosion resistance, paraffin mitigation, etc.) to be derived from its mixture with the produced fluids.

The control over the chemical treatment injection implemented by use of the chemical injection valve is preferably consistent and predictable, so that sufficient chemical treatment is injected to obtain the desired benefits, and excess chemical treatment is not injected (which would potentially be costly and wasteful).

Therefore, it will be appreciated that improvements in the art of constructing and utilizing chemical injection valves are continually needed. Such improvements may be useful in a variety of different well configurations and operations, and not exclusively in hydrocarbon production operations.

DETAILED DESCRIPTION

Figure 1:
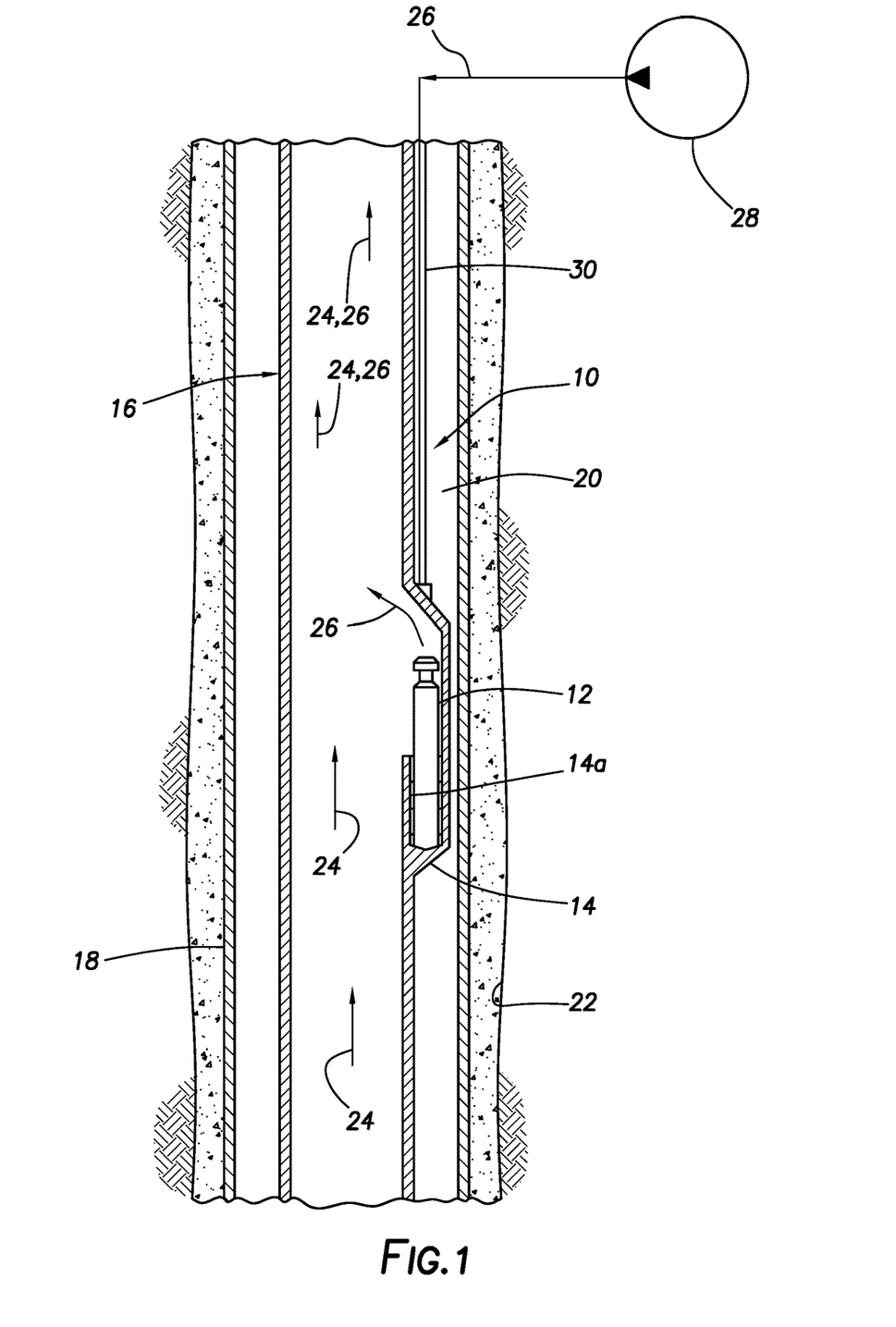
FIG. 1 is a representative partially cross-sectional view of an example of a well system and associated method which can embody principles of this disclosure.

Representatively illustrated in FIG. 1 is a system 10 for use with a subterranean well, and an associated method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a chemical injection valve 12 is installed in a seal bore 14a of a conventional side pocket mandrel 14 connected as part of a tubular string 16 in the well. The tubular string 16 may be substantially continuous or segmented, may be made of steel, composite or other materials, and may be of the types known to those skilled in the art as production tubing, conduit, pipe or other tubulars.

As depicted in FIG. 1, the tubular string 16 is positioned inside a liner or casing 18, so that an annulus 20 is formed between the tubular string 16 and the casing 18. The casing 18 is cemented in a wellbore 22. However, in other examples, the liner or casing 18 may not be cemented in the wellbore 22, the wellbore may be deviated or horizontal, etc. Thus, the scope of this disclosure is not limited to any particular details of the well or any of its components as depicted in the example of FIG. 1.

Production fluid 24 (such as, oil, gas, water, gas condensates, combinations thereof, etc.) flows through the tubular string 16 toward the earth's surface (e.g., to a land or water-based production facility, pipeline or rig). The chemical injection valve 12 is used to control injection of a chemical treatment 26 into the tubular string 16, so that the production fluid 24 and/or an interior of the tubular string is treated as the production fluid flows toward the surface.

The chemical treatment 26 may serve any of a variety of different purposes or combination of purposes. For example, the chemical treatment 26 may inhibit paraffin formation in the fluid 24, inhibit corrosion in the tubular string 16 or surface equipment, serve as a surfactant, prevent undesired precipitation of substances from the fluid, etc. The scope of this disclosure is not limited to any particular purpose or combination of purposes for the chemical treatment 26.

In the FIG. 1 example, the chemical treatment 26 is delivered to the chemical injection valve 12 by a pump 28, which flows the chemical treatment 26 through an umbilical or control line 30 extending along the tubular string 16 to the side pocket mandrel 14. In other examples, the chemical treatment 26 could be flowed through the annulus 20 from the surface, without use of the control line 30, or the control line could be otherwise positioned.

Figure 2:
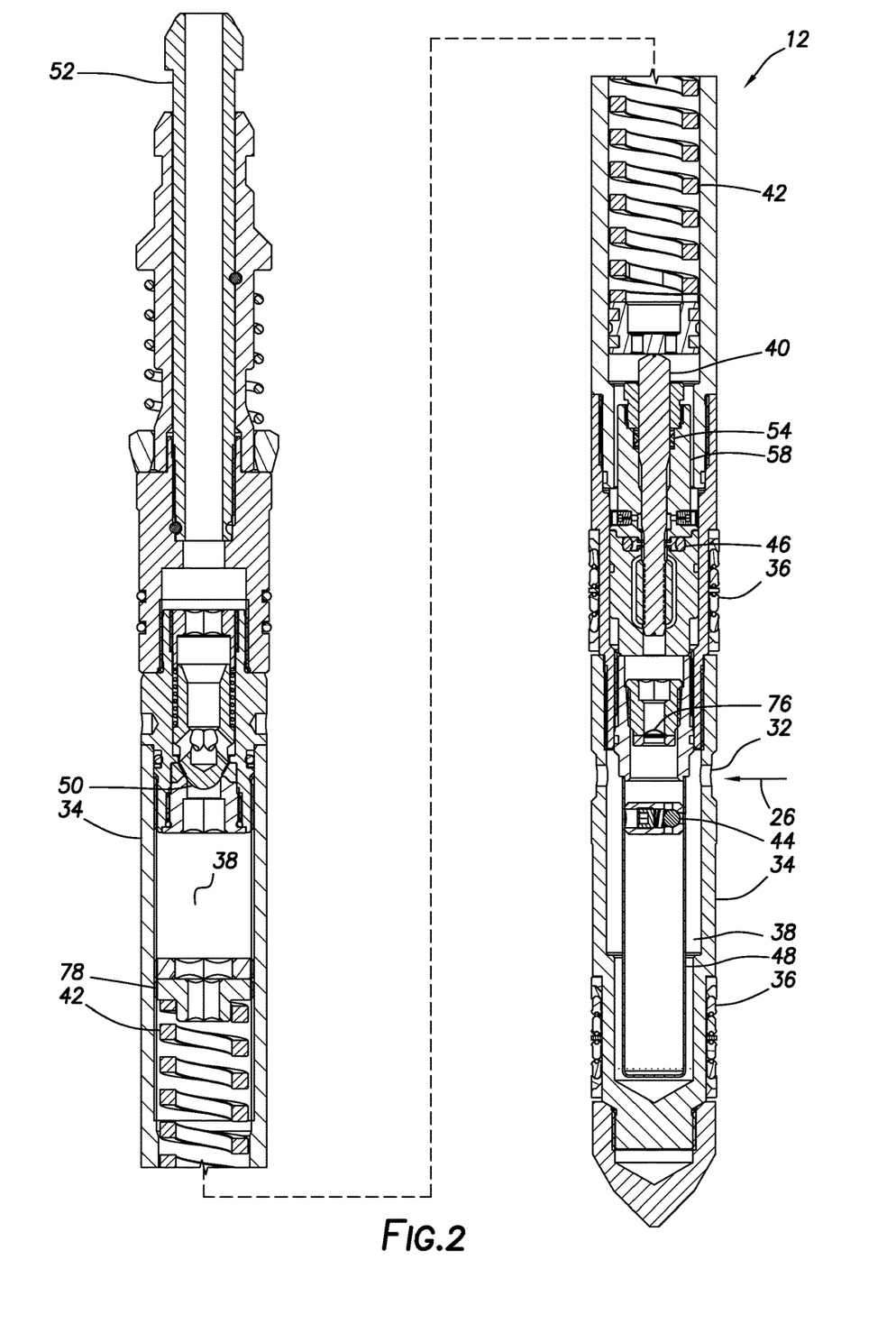
FIG. 2 is a representative cross-sectional view of an example of a chemical injection valve that may be used with the system and method of FIG. 1, and which can incorporate the principles of this disclosure.

Referring additionally now to FIG. 2, a cross-sectional view of an example of the chemical injection valve 12 is representatively illustrated. The valve 12 is described below as it may be used in the FIG. 1 system 10 and method. However, the FIG. 2 chemical injection valve 12 may be used in other systems and methods, in keeping with the principles of this disclosure.

In the FIG. 2 example, the valve 12 receives the chemical treatment 26 via ports 32 formed through a generally tubular outer housing assembly 34 between two longitudinally spaced apart external seal assemblies 36. In the FIG. 1 system 10, the seal assemblies 36 are sealingly engaged in the seal bore 14a of the side pocket mandrel 14.

The chemical treatment 26 flows into an internal longitudinal flow passage 38 of the valve 12. The chemical treatment 26 is filtered by flowing through a filter 48. A relief valve 44 can admit the chemical treatment 26 into an interior of the filter 48, in the event that the filter should become plugged or otherwise incapable of effectively filtering the chemical treatment.

A rupture disc 76 initially blocks upward flow of the chemical treatment 26 through the flow passage 38 from the filter 48. After the chemical injection valve 12 has been installed in the side pocket mandrel 14, pressure can be applied by the pump 28 to the control line 30, in order to increase a pressure differential from below to above the rupture disc 76, and eventually burst the rupture disc and permit the chemical treatment 26 to flow further upward through the flow passage 38.

A valve stem 40 blocks flow of the chemical treatment 26 through the passage 38 to an upper section of the valve 12, unless a pressure differential from below to above the stem 40 (as viewed in FIG. 2) is great enough to overcome a biasing force exerted by a biasing device 42 (depicted in FIG. 2 as a coiled compression spring, but other types of biasing devices may be used, if desired). A longitudinally adjustable stop 78 provides for adjusting the biasing force exerted by the biasing device 42, and thereby provides for adjusting the pressure differential required to upwardly displace the stem 40.

When closed, the stem 40 is sealingly engaged with a primary resilient seal 46. The primary seal 46 is "resilient" in that a resilient material of the primary seal sealingly engages a sealing surface on another component (in this case an external surface or outer diameter of the stem 40). The resilient material could comprise, for example, an elastomer (such as, a nitrile or fluoro-elastomer material) or other material having suitable elasticity and sealing capability (including suitability for exposure to the chemical treatment 26).

As used herein, the term "resilient seal" does not require the seal to be made entirely of resilient material (for example, the seal could comprise a spring, plastic or composite material for energizing the seal (e.g., biasing it into sealing contact with the stem 40), preventing extrusion, etc.). However, the scope of this disclosure is not limited to use of a resilient primary seal.

When the stem 40 displaces upward in response to the pressure differential across the stem being at or above a predetermined level sufficient to overcome the biasing force exerted by the biasing device 42, flow through the passage 38 to the upper section of the valve 12 is permitted. The chemical treatment 26 flows upward through a back-flow preventing check valve 50, and then through a tubular fishing neck 52 and into an interior of the tubular string 16. The chemical treatment 26 mixes with the produced fluid 24 as it flows toward the surface.

The chemical injection valve 12 example depicted in FIG. 2 uses an elastomer or other resilient seal material in the primary seal 46, and can use a metal-to-metal redundant or secondary seal 54. This arrangement achieves complete valve closing (with complete absence of flow through the valve 12), due to the resilient primary seal 46, with the durable metal secondary seal 54 sealing between the stem 40 and an inner stem housing 58 throughout operation of the valve 12.

As depicted in FIG. 2, the seal 54 is retained in the stem housing 58 for sliding and sealing engagement with an exterior surface of the stem 40. In other examples, the seal 54 could instead be carried on the stem 40 for sliding and sealing engagement with an interior surface of the stem housing 58.

Note that the specific combination, configuration and arrangement of valve 12 components depicted in FIG. 2 may be different in other examples. Thus, the scope of this disclosure is not limited to only the particular components or combination of components of the chemical injection valve 12 as described herein or depicted in the drawings.

Figure 3:
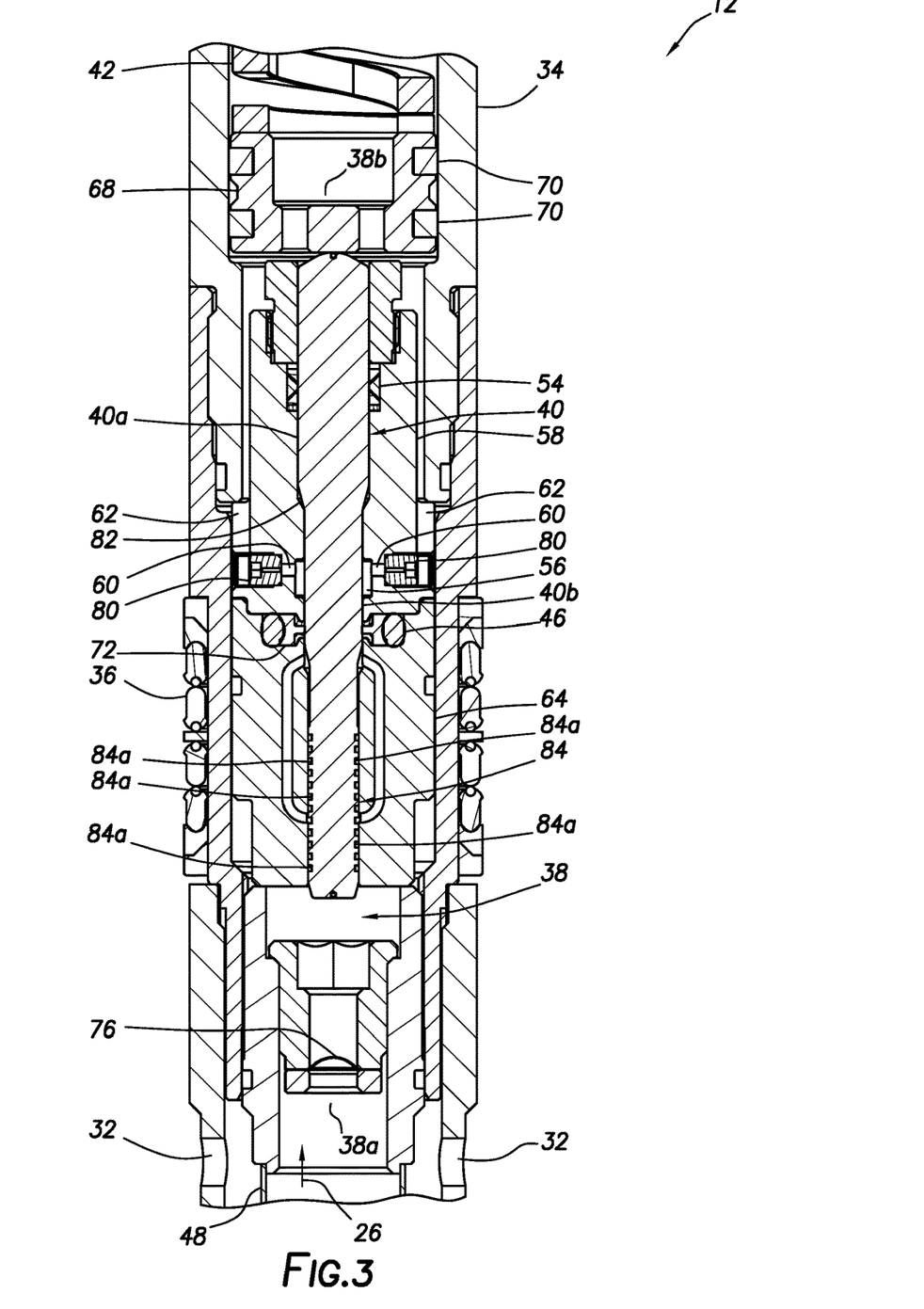
FIG. 3 is a representative cross-sectional view of a portion of the FIG. 2 chemical injection valve in a closed configuration.

Referring additionally now to FIG. 3, a more detailed, enlarged cross-sectional view of a portion of the chemical injection valve 12 is representatively illustrated. The valve 12 is depicted in a closed configuration in FIG. 3.

In the FIG. 3 example, the secondary seal 54 is positioned in an annular recess formed in the stem housing 58. The secondary seal 54 continuously engages an exterior surface 40a on the stem 40 as the stem displaces between its closed and open positions. Thus, flow through an annular space 82 between the stem 40 and the stem housing 58 is continuously prevented during operation of the valve 12.

The metal secondary seal 54 may comprise a metal or metal alloy, to produce metal-to-metal sealing with the stem 40 exterior surface 40a, and to thereby prevent flow through the annular space 82. The seal 54 is referred to herein as a "metal" seal, in that the metal or metal alloy of the seal sealingly engages another component (in this case the exterior surface 40a of the stem 40).

The term "metal seal" as used herein does not require that the seal 54 is made entirely of metal (for example, the seal could comprise a resilient material that biases a metal or metal alloy component into contact with the exterior surface 40a of the stem 40). However, the scope of this disclosure is not limited to use of a metal secondary seal.

Note that bypass passages 60 are in communication with an annulus 56 formed radially between the stem 40 and the stem housing 58, and positioned longitudinally between the primary resilient seal 46 and the metal secondary seal 54. The bypass passages 60 are also in communication with longitudinally extending recesses 62 formed on an exterior of the stem housing 58.

Orifices or other types of flow restrictors 80 may be used to restrict flow from the annulus 56. In the example depicted in FIG. 3, the flow restrictors 80 are installed between the bypass passages 60 and the recesses 62, but the flow restrictors could be otherwise positioned in other examples.

It will, thus, be readily appreciated that, when the stem 40 displaces upward and disengages from the primary resilient seal 46, after the rupture disc 76 has burst, the chemical treatment 26 can flow from a lower section 38a of the passage 38 to an upper section 38b of the passage 38 via the bypass passages 60, while the seal 54 remains sealingly engaged in the stem housing 58.

When injection pressure is applied (such as, via the pump 28 and control line 30, see FIG. 1), the biasing device 42 is compressed and the valve 12 opens for flow of the chemical treatment 26 to the upper section 38b of the flow passage 38. The chemical treatment 26 flow is directed to bypass the stem 40 via the bypass passages 60. The flow also bypasses the resilient primary seal 46 when the valve 12 is fully open, in that the stem 40 remains sealingly engaged in the stem housing 58 by the secondary seal 54 when the primary seal 46 is not sealingly engaged with the stem.

When the valve 12 starts to open, the flow is directed through a narrow annular gap 66 (see FIG. 5) between an outer diameter of the stem 40 and an inner diameter of the housing 58 (just above the primary seal 46 as depicted in FIG. 3). This creates significant flow resistance until the stem 40 is displaced away from the primary resilient seal 46, opening a larger bypass flow path (via the bypass passages 60 and recesses 62) for increased flow. In the FIG. 3 example, the flow restrictors 80 will also restrict any flow of the chemical treatment 26 between the bypass passages 60 and recesses 62.

A tortuous flow path 84 for the chemical treatment 26 is also provided upstream or below the primary seal 46 as depicted in FIG. 3. In this example, the tortuous flow path is in the form of annular grooves 84a formed on a lower portion of the stem 40. The lower portion of the stem 40 is closely fitted in a seal housing 64 (with a minimal annular gap between the stem and the seal housing), so that flow of the chemical treatment 26 through the tortuous flow path 84 is substantially restricted.

At this point (the valve 12 partially open), the stem 40 can oscillate (e.g., with piston pump-produced pressure impulses) proximate a lower edge of the annulus 56 that communicates with the bypass passages 60 longitudinally spaced apart from the resilient primary seal 46. In this manner, the primary seal 46 does not engage the stem 40 during injection of the chemical treatment 26 while the valve 12 is open or partially open. It is expected that a longer distance between the annulus 56 and the primary seal 46 (that is, a longer distance of the relatively small annular gap 66 between the stem 40 and the stem housing 58, see FIG. 5), and the restriction to flow provided by the tortuous flow path 84 and the flow restrictors 80, will provide for less flow erosion of the primary seal.

Note that an outer diameter (at the exterior surface 40a) of the stem 40 sealingly engaged by the secondary seal 54 is greater than an outer diameter (at an exterior surface 40b) of the stem 40 where it is sealingly engaged by the primary seal 46 in the FIG. 3 example. Thus, less pressure differential across the stem 40 is required to maintain the stem in an open or partially open position, as compared to the pressure differential required to displace the stem upward while it is sealingly engaged by the primary seal 46. This helps to prevent the primary seal 46 from engaging the stem 40 during injection of the chemical treatment 26.

The valve stem 40 and the secondary metal seal 54 can comprise metals and alloys that are resistant to erosion. Once flow stops, the biasing device 42 can expand and push the stem 40 into the resilient primary seal 46, and completely close the valve 12 to flow of the chemical treatment 26.

The valve stem 40 in this example enters the primary seal 46 and displaces therein a certain distance (for example, approximately 4 mm) to completely close the valve 12. The primary resilient seal 46 is preferably annular shaped and completely blocks flow through the annular gap 66 (see FIG. 5) upon initial contact with the valve stem 40.

The primary resilient seal 46 in the FIG. 3 example is retained in an annular recess 72 formed in an upper end of the seal housing 64, and is positioned longitudinally between the stem housing 58 and the seal housing 64. The seal 46 is captive between the housings 58, 64, which helps to prevent dislodging of the seal due to high velocity flow through the passage 38.

The secondary seal 54 can be a wedge-type seal comprising one or more wedge or conical shaped metal or metal alloy components that are biased into sealing contact with the stem exterior surface 40a. However, the scope of this disclosure is not limited to use of any particular configuration or material for the secondary seal 54 in the valve 12.

The seal 54 preferably remains engaged between the valve stem 40 and the stem housing 58 continuously while the valve 12 is in its open, partially open and closed configurations. This dynamic secondary seal 54 has a known sealing diameter (in this example, at the exterior surface 40a of the stem 40), which results in a precise, predictable differential pressure to maintain the valve 12 in its open configuration.

The biasing force exerted by the biasing device 42 is transmitted to the stem 40 via a reciprocably displaceable member 68. Carried in annular grooves on an outer diameter of the member 68 are friction-reducing rings 70 (comprising relatively low friction materials, such as, PTFE, PEEK, etc.). By reducing friction in the application of the biasing device 42 biasing force to the stem 40, and friction in the stem's upward displacement in response to the pressure differential across the stem, the pressures at which the valve 12 opens and closes are more predictable and consistent.

Figure 4:
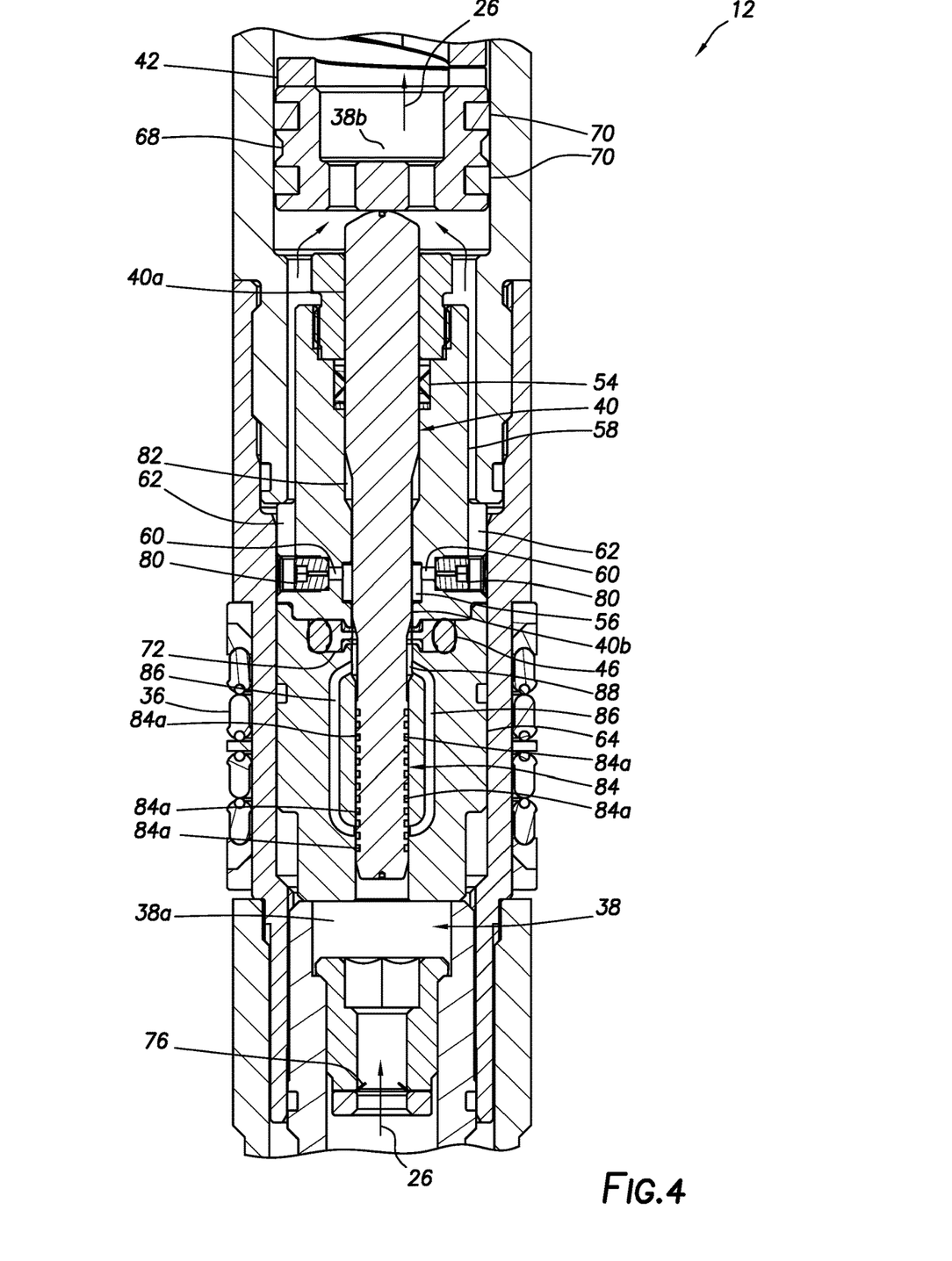
FIG. 4 is a representative cross-sectional view of a portion of another example of the chemical injection valve in a partially open configuration.

Referring additionally now to FIG. 4, a further detailed and enlarged cross-sectional view of a portion of the chemical injection valve 12 is representatively illustrated. In this view, the valve 12 is in a partially open configuration, with the chemical treatment 26 flowing upward from the passage lower section 38a to the passage upper section 38b via the bypass passages 60.

In the partially open configuration of FIG. 4, the rupture disc 76 has been burst by applying a predetermined pressure differential across the rupture disc. After the rupture disc 76 is burst, a sufficient differential pressure is applied across the stem 40 (across the lower outer diameter of the stem at its sealing engagement with the primary seal 46 at the exterior surface 40b) to overcome the downwardly directed biasing force exerted by the biasing device 42, so that the stem is displaced upward.

Flow of the chemical treatment 26 is substantially restricted at the tortuous flow path 84, at the annular gap 66 between the stem 40 and the stem housing 58 (see FIG. 5), and at the flow restrictors 80. However, note that, as the stem 40 displaces upward, fewer of the annular grooves 84a are positioned below, or upstream of, bypass passages 86 in communication with an annulus 88 formed radially between the stem 40 and the seal housing 64.

The annulus 88 provides for relatively unrestricted flow of the chemical treatment 26 past the primary seal 46, and thereby also aids in preventing erosion of the primary seal. Thus, as the stem 40 displaces upward when the pressure differential across the stem is increased, flow of the chemical treatment 26 is progressively less restricted through the tortuous flow path 84. However, the flow continues to be restricted at the annular gap 66 (until the valve 12 is fully open, as described more fully below) and at the flow restrictors 80. These restrictions to flow of the chemical treatment 26 help to prevent erosion of the primary seal 46 that might occur otherwise due to a relatively high velocity flow of the chemical treatment.

Figure 5:
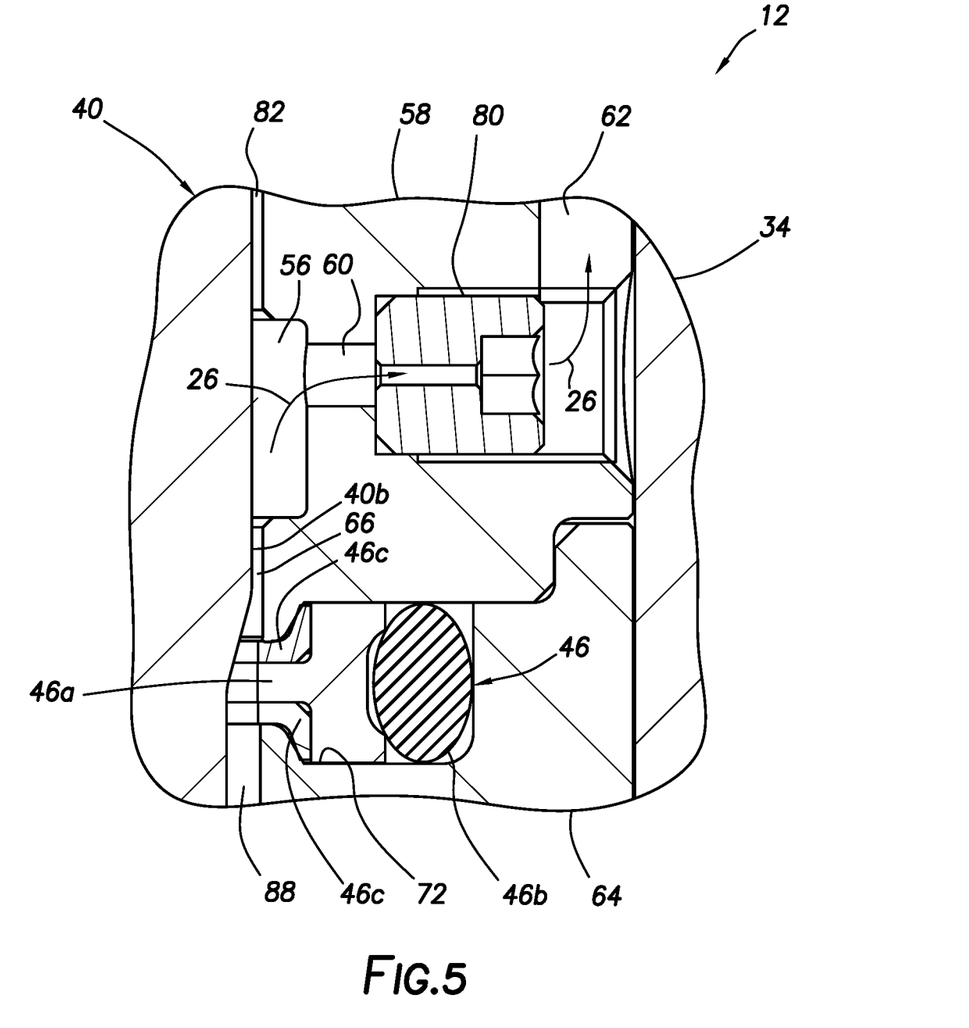
FIG. 5 is a representative cross-sectional view of a portion of another example of the chemical injection valve in a partially open configuration.

Referring additionally now to FIG. 5, a further enlarged cross-sectional view of a portion of the valve 12 is representatively illustrated. The stem 40 is in its partially open position as depicted in FIG. 5, with the exterior surface 40b of the stem 40 disengaged from the primary seal 46, but still at least partially below the annulus 56.

Note that the chemical treatment 26 flows through the relatively thin (in a radial direction) annular gap 66 between the exterior surface 40b of the stem 40 and the housing 58. The gap 66 is spaced apart from the primary seal 46, and so erosion of the seal is mitigated.

The annular gap 66 in this example is positioned longitudinally between the annulus 56 and the primary seal 46. The gap 66 is preferably thinner radially as compared to the annulus 56.

The primary seal 46 in this example includes a resilient material 46a that is biased into sealing contact with the stem 40 in the closed position of the stem (see FIG. 3) by another resilient material 46b. A relatively rigid material 46c is provided on opposite longitudinal sides of the resilient material 46a for extrusion resistance, and for prevention of damage to the resilient material 46a when the stem 40 displaces downward into sealing engagement with the seal 46 and upward out of sealing engagement with the seal. However, the scope of this disclosure is not limited to use of any particular configuration or combination of materials in the primary seal 46.

Figure 6:
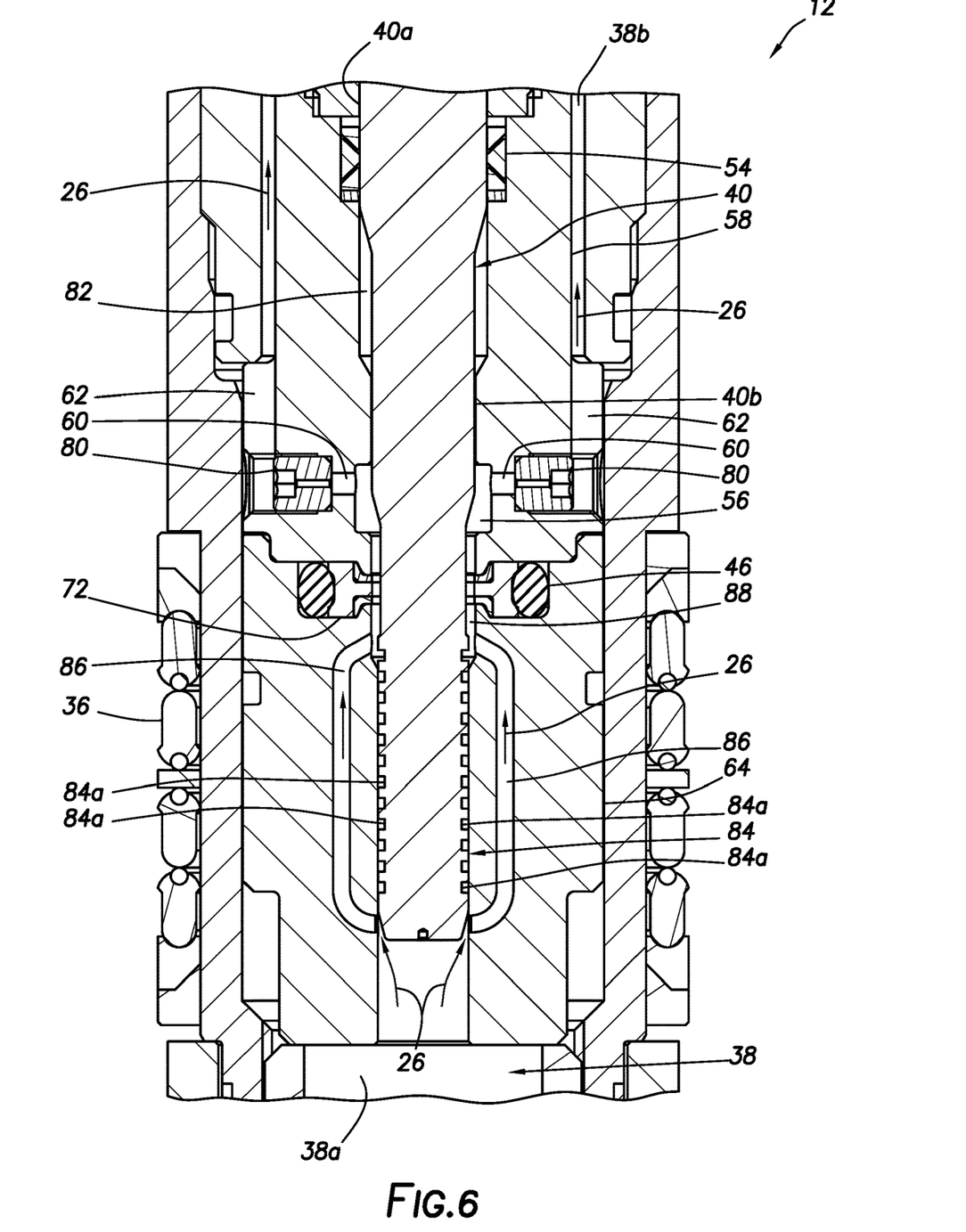
FIG. 6 is a representative cross-sectional view of a portion of another example of the chemical injection valve in an open configuration.

Referring additionally now to FIG. 6, another cross-sectional view of the valve 12 is representatively illustrated. In this view, the valve 12 is in its fully open configuration. The chemical treatment 26 can flow relatively freely through the flow passage 38, except for the restriction to flow provided by the flow restrictors 80.

As the pressure differential from below to above the stem 40 (across the outer diameter at the exterior surface 40a engaged by the secondary seal 54) increases, the stem will displace further upward to provide less restriction to flow of the chemical treatment 26. As the flow restriction decreases, the pressure differential across the stem 40 also decreases.

Thus, the stem 40 will oscillate about an equilibrium position that permits the chemical treatment 26 to flow through the valve 12 at a flow rate determined by the output of the pump 28 (see FIG. 1). The restriction to flow at this flow rate can be adjusted using the stop 78 (see FIG. 2) to adjust the biasing force exerted by the biasing device 42, and/or by varying the restriction to flow provided by the flow restrictors 80.

Note that the tortuous flow path 84 no longer substantially restricts flow of the chemical treatment 26. Instead, substantially all of the chemical treatment 26 flows relatively unimpeded through the bypass passages 86 from below the stem 40 to the annulus 88. In this example, all of the annular grooves 84a are positioned above or downstream of inlets of the bypass passages 86.

In other examples, the tortuous flow path 84 could be configured with structures other than the annular grooves 84a. For example, bluff bodies, threads, roughened surfaces, etc. may be used. In addition, the structures could be formed in the seal housing 64, instead of, or in addition to, those on the stem 40. Thus, the scope of this disclosure is not limited to any particular configuration or structures used to restrict flow of the chemical treatment 26 upstream of the primary seal 46.

The tortuous flow path 84 comprises a variable flow restrictor that restricts the flow of the chemical treatment 26 when the primary seal 46 disengages from the valve stem 40 exterior surface 40b. A restriction to flow of the chemical treatment 26 into the bypass passages 86 decreases as the valve stem 40 displaces upward toward its open position. Eventually, the flow of the chemical treatment 26 into the bypass passages 86 becomes relatively unimpeded.

It may now be fully appreciated that the above disclosure provides significant advancements to the art of constructing and operating chemical injection valves for use with subterranean wells. In examples described above, a chemical injection valve enhances control of chemical treatment injection and reduces erosion of seals.

A chemical injection valve 12 for use in a subterranean well is provided to the art by the above disclosure. In one example, the chemical injection valve 12 can include a valve stem 40 reciprocably disposed relative to a primary seal 46, the valve stem 40 being displaceable relative to the primary seal 46 between closed and open positions, and flow between first and second sections 38a,b of a flow passage 38 being selectively prevented and permitted in the respective closed and open positions; and a variable flow restrictor (e.g., comprising the tortuous flow path 84) upstream of the primary seal 46 relative to a direction of flow through the chemical injection valve 12. The variable flow restrictor 84 restricts the flow when the valve stem 40 is disengaged from the primary seal 46.

The variable flow restrictor may comprise a tortuous flow path 84. The tortuous flow path 84 may include a series of longitudinally spaced apart annular grooves 84a.

The variable flow restrictor may comprise a plurality of structures (such as, the annular grooves 84a) formed on or in at least one of the valve stem 40 and a housing 64 surrounding a portion of the valve stem 40.

A restriction to the flow through the variable flow restrictor may decrease as the valve stem 40 displaces from the closed position toward the open position.

The variable flow restrictor may restrict the flow into a bypass passage 86 in communication with an annulus 88 positioned upstream of the primary seal 46.

An annular gap 66 between the valve stem 40 and a housing 58 may restrict the flow when the valve stem 40 disengages from the primary seal 46. The chemical injection valve 12 may include an annulus 56 positioned downstream of the primary seal 46. The annular gap 66 may be positioned between the primary seal 46 and the annulus 56.

The chemical injection valve 12 may include a metal secondary seal 54 which prevents flow through an annular space 82 surrounding the valve stem 40.

The chemical injection valve 12 may include an annulus 56 positioned between the metal secondary seal 54 and the primary seal 46, and a bypass passage 60 in communication with the annulus 56. The chemical injection valve 12 may include a fixed flow restrictor 80 that restricts the flow through the bypass passage 60.

The primary seal 46 may comprise a resilient material 46a that sealingly engages the valve stem 40 in the closed position.

A chemical injection system 10 for use with a subterranean well is also provided to the art by the above disclosure. In one example, the system 10 can include a chemical treatment 26 pumped through a chemical injection valve 12 and into an interior of a tubular string 16 in the well. The chemical injection valve 12 can comprise first and second flow passage sections 38a,b, a valve stem 40 reciprocable between closed and open positions to thereby respectively prevent and permit flow of the chemical treatment 26 between the first and second flow passage sections 38a,b, a primary seal 46 sealingly engaged with the valve stem 40 in the closed position and disengaged from the valve stem 40 in the open position, and a first flow restrictor 80 that restricts the flow of the chemical treatment 26 downstream from the primary seal 46 in the open position.

The first flow restrictor 80 may be in communication with an annulus 56 surrounding the valve stem 40, the annulus 56 being downstream relative to the primary seal 46 and upstream relative to the first flow restrictor 80.

An annular gap 66 between the valve stem 40 and a housing 58 may restrict the flow of the chemical treatment 26 when the valve stem 40 disengages from the primary seal 46. The annular gap 66 may be downstream relative to the primary seal 46 and upstream relative to the annulus 56.

The chemical injection system 10 may include a metal secondary seal 54 which prevents flow through an annular space 82 surrounding the valve stem 40. The first flow restrictor 80 may be in communication with an annulus 56 positioned longitudinally between the primary seal 46 and the metal secondary seal 54.

The primary seal 46 may include a resilient material 46a that sealingly engages the valve stem 40 in the closed position.

The chemical injection system 10 may include a second flow restrictor (e.g., comprising the tortuous flow path 84) that variably restricts the flow of the chemical treatment 26 upstream of the primary seal 46. The second flow restrictor can comprise a tortuous flow path 84.

The second flow restrictor may comprise a plurality of structures (such as the annular grooves 84a) formed on or in at least one of the valve stem 40 and a housing 64 surrounding a portion of the valve stem 40.

A restriction to the flow through the second flow restrictor may decrease as the valve stem 40 displaces from the closed position toward the open position.

The second flow restrictor may variably restrict the flow into a bypass passage 86 in communication with an annulus 88 positioned upstream of the primary seal 46.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as, "above," "below," "upper," "lower," "upward," "downward," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A chemical injection valve for use in a subterranean well, the chemical injection valve comprising:
    a valve stem reciprocably disposed relative to a primary seal, the valve stem being displaceable relative to the primary seal between closed and open positions, and flow between first and second sections of a flow passage being selectively prevented and permitted in the respective closed and open positions, in which the valve stem displaces from the closed position to the open position in response to a pressure differential across the valve stem being at or above a predetermined level, and in which the valve stem returns to the closed position in response to a reduction in the pressure differential below the predetermined level; and
    a variable flow restrictor upstream of the primary seal relative to a direction of flow through the chemical injection valve,
    in which the variable flow restrictor restricts the flow when the valve stem is disengaged from the primary seal.

2. The chemical injection valve of claim 1, in which the variable flow restrictor comprises a tortuous flow path.

3. The chemical injection valve of claim 2, in which the tortuous flow path comprises a series of longitudinally spaced apart annular grooves.

4. The chemical injection valve of claim 1, in which the variable flow restrictor comprises a plurality of structures formed on or in at least one of the group consisting of the valve stem and a housing surrounding a portion of the valve stem.

5. The chemical injection valve of claim 1, in which a restriction to the flow through the variable flow restrictor decreases as the valve stem displaces from the closed position toward the open position.

6. The chemical injection valve of claim 1, in which the variable flow restrictor restricts the flow into a bypass passage in communication with an annulus positioned upstream of the primary seal.

7. The chemical injection valve of claim 1, in which an annular gap between the valve stem and a housing restricts the flow when the valve stem disengages from the primary seal.

8. The chemical injection valve of claim 7, further comprising an annulus positioned downstream of the primary seal, and in which the annular gap is positioned between the primary seal and the annulus.

9. The chemical injection valve of claim 1, further comprising a metal secondary seal which prevents flow through an annular space surrounding the valve stem.

10. The chemical injection valve of claim 9, further comprising an annulus positioned between the metal secondary seal and the primary seal, and a bypass passage in communication with the annulus.

11. The chemical injection valve of claim 10, further comprising a fixed flow restrictor that restricts the flow through the bypass passage.

12. The chemical injection valve of claim 9, in which the primary seal comprises a resilient material that sealingly engages the valve stem in the closed position.

13. A chemical injection system for use with a subterranean well, the system comprising:
    a chemical treatment pumped through a chemical injection valve and into an interior of a tubular string in the well, and
    the chemical injection valve comprising first and second flow passage sections, a valve stem reciprocable between closed and open positions to thereby respectively prevent and permit flow of the chemical treatment between the first and second flow passage sections, a primary seal sealingly engaged with the valve stem in the closed position and disengaged from the valve stem in the open position, a first flow restrictor that restricts the flow of the chemical treatment downstream from the primary seal in the open position, and a second flow restrictor that variably restricts the flow of the chemical treatment upstream of the primary seal.

14. The chemical injection system of claim 13, in which the first flow restrictor is in communication with an annulus surrounding the valve stem, the annulus being downstream relative to the primary seal and upstream relative to the first flow restrictor.

15. The chemical injection system of claim 14, in which an annular gap between the valve stem and a housing restricts the flow of the chemical treatment when the valve stem disengages from the primary seal.

16. The chemical injection system of claim 15, in which the annular gap is downstream relative to the primary seal and upstream relative to the annulus.

17. The chemical injection system of claim 13, further comprising a metal secondary seal which prevents flow through an annular space surrounding the valve stem.

18. The chemical injection system of claim 17, in which the first flow restrictor is in communication with an annulus positioned longitudinally between the primary seal and the metal secondary seal.

19. The chemical injection system of claim 18, in which the primary seal comprises a resilient material that sealingly engages the valve stem in the closed position.

20. The chemical injection system of claim 13, in which the second flow restrictor comprises a tortuous flow path.

21. The chemical injection system of claim 13, in which the second flow restrictor comprises a plurality of structures formed on or in at least one of the group consisting of the valve stem and a housing surrounding a portion of the valve stem.

22. The chemical injection system of claim 13, in which a restriction to the flow through the second flow restrictor decreases as the valve stem displaces from the closed position toward the open position.

23. The chemical injection system of claim 13, in which the second flow restrictor variably restricts the flow into a bypass passage in communication with an annulus positioned upstream of the primary seal.

* * * * *